Sept. 18, 1945. H. G. HUGHEY 2,384,921
APPARATUS FOR CUTTING METAL
Filed Jan. 14, 1944
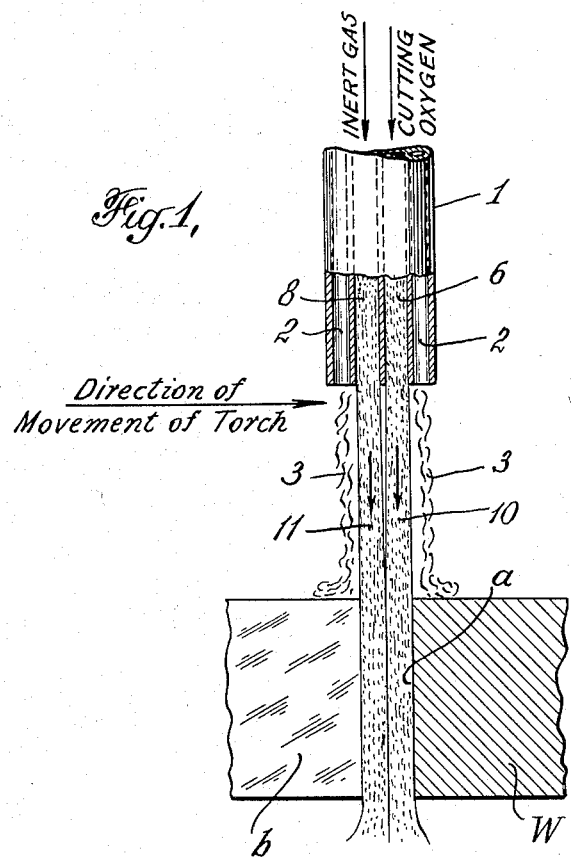
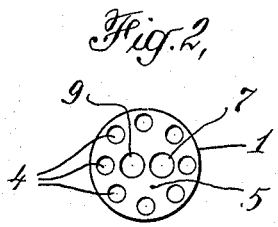
INVENTOR
Howard G. Hughey
BY
Pennie, Davis, Marvin & Edmonds
ATTORNEYS Patented Sept. 18, 1945

2,384,921

UNITED STATES PATENT OFFICE 2,384,921

APPARATUS FOR CUTTING METAL

Howard G. Hughey, Fanwood, N. J., assignor to Air Reduction Company, Incorporated, a corporation of New York Application January 14, 1944, Serial No. 518,283

2 Claims. (Cl. 158—27.4)

This invention relates to the art of cutting metal by means of gas cutting torches.

If a jet of gas is unconfined the gas will lose velocity and spread out as it moves away from the orifice from which the jet issues. For equal velocities at the orifice, larger jets, i. e., those of greater cross-section, travel farther before they spread out.

The thickness of metal that can be cut with a given oxygen jet depends upon the distance that the jet will travel through a kerf without losing velocity and spreading out. In the case of a jet confined in a kerf the spreading out is mostly in the nature of a fanning-out toward the rear since the metal confines the jet on the other three sides. The velocity of the jet and its spreading or fanning-out are inter-related since the gas cannot lose velocity unless the jet has an opportunity to spread. In many operations it is desirable to use as small an oxygen jet as possible for cutting any particular thickness of work.

The object of this invention is to provide an improved apparatus for cutting metal by which an oxygen jet is made to penetrate farther into a kerf without fanning-out than it would otherwise be capable of doing, thus enabling a workpiece of particular thickness to be cut with the use of less oxygen and making it possible to cut work-pieces of greater thickness by means of an oxygen jet of given size.

According to the invention the face of the torch tip may have the usual circular series of peripheral orifices for the preheating flame jets, but instead of having the usual single central orifice for the cutting oxygen it has two gas discharge orifices one of which is located directly to the rear of the other. Cutting oxygen is supplied by the torch and by a passage in the tip to the front discharge orifice, and an inert gas, such as nitrogen or air, is supplied by the torch and by a passage in the tip to the rear discharge orifice. The jet of inert gas issuing from the rear discharge orifice gives the combined or composite stream the penetrating power of a large jet but without increasing the oxygen consumption and without proportional increase in cost.

The accompanying drawing shows a torch tip embodying the invention. In the drawing:

Figure 1 represents the torch tip partly in side elevation and partly in vertical section and represents the work-piece in vertical section taken substantially in the plane of the kerf made by the torch; and Fig. 2 is a bottom view of the torch tip looking directly at the face of the tip showing the arrangement of discharge orifices in it.

The tip of the torch is shown at 1. It may have the usual circular series of gas passages 2 through which a mixture of oxygen and fuel gas, such as acetylene, passes to feed the preheating flame jets represented at 3. The passages 2 terminate in a circular series of discharge orifices 4 in the face 5 of the tip as shown in Fig. 2. Any other suitable arrangement of passages and discharge orifices may be employed if desired for supplying a combustible gas mixture to the preheating flames.

In addition to the passage 6 for the cutting oxygen (Fig. 1), and its discharge orifice 7 in the face of the tip (Fig. 2), there is a second passage 8 parallel to and adjacent the cutting oxygen passage 6. This passage is located to the rear of the cutting oxygen passage and terminates in a discharge orifice 9 (Fig. 2) immediately to the rear of the discharge orifice 7 for the cutting oxygen. The torch supplies cutting oxygen to the passage 6 which issues in a jet represented at 10 (Fig. 1) when the cutting oxygen valve of the torch is opened. The torch supplies nitrogen, air, or some other inert gas to the passage 8 which issues in a jet represented at 11 (Fig. 1) immediately to the rear of the cutting oxygen jet.

It will be understood that the preheating flames 3 heat the metal of the work-piece to kindling temperature and that the jet of cutting oxygen then cuts through the metal in a manner well understood in the art. The jet of nitrogen or other inert gas acts purely in a mechanical manner to back up the cutting oxygen jet. In effect it is a shield which prevents the cutting oxygen jet from fanning-out toward the rear to any great extent before it has passed entirely through the work-piece represented at W in Fig. 1. An attempt has been made to indicate in the drawing in more or less diagrammatic or exaggerated fashion this prevention of rearward spreading of the oxygen jet until it has passed entirely or substantially through the work-piece by showing the lines representing the cutting oxygen jet in parallel relation throughout the thickness of the work-piece, and it has been attempted to indicate the consequent ability of the cutting oxygen jet to cut entirely through the relatively thick work-piece W by showing the front wall a of the kerf b as being straight throughout the thickness of the work-piece.

The velocities of the two jets may be the same, but this is not essential so long as there is not enough difference in velocity to cause turbulence and mixing of the streams with resulting dilution of the cutting oxygen.

I claim:

1. A gas cutting torch having a tip, a number of gas passages in the tip terminating in a circular series of discharge orifices in the face of the tip for supplying a combustible gas mixture to preheating flames, and two adjacent passages in the tip terminating in central discharge orifices in the face of the tip both of which are located within said circular series of discharge orifices, one of said central discharge orifices being located immediately to the rear of the other, and the passage having the forward one of said central discharge orifices being in communication with a source of cutting oxygen and the passage having the rearward one of said central discharge orifices being in communication with a source of inert gas.

2. A gas cutting torch having a tip, a number of gas passages in the tip terminating in a circular series of discharge orifices in the face of the tip for supplying a combustible gas mixture to preheating flames, and two adjacent passages in the tip terminating in central discharge orifices in the face of the tip, both of which are located within said circular series of discharge orifices, one of said last named passages being in communication with a source of cutting oxygen and the other of said passages being in communication with a source of inert gas.

HOWARD G. HUGHEY.